United States Patent [19]

Meintjes et al.

[11] Patent Number: 4,992,345
[45] Date of Patent: Feb. 12, 1991

[54] ELECTROCHEMICAL CELLS

[75] Inventors: Anthony A. Meintjes; Johan Coetzer, both of Pretoria; Keith T. Adendorff, Springs, all of South Africa

[73] Assignee: Lilliwyte Societe Anonyme, South Africa

[21] Appl. No.: 454,299

[22] Filed: Dec. 21, 1989

[30] Foreign Application Priority Data

Dec. 22, 1988 [GB] United Kingdom ............... 8829948

[51] Int. Cl.⁵ .......................................... H01M 10/44
[52] U.S. Cl. ................................... 429/103; 204/2.1; 29/623.1
[58] Field of Search .................. 429/103; 204/2.1; 29/623.1

[56] References Cited

U.S. PATENT DOCUMENTS

| 4,024,320 | 5/1977 | Gibson et al. | 429/104 |
|---|---|---|---|
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,797,333 | 1/1989 | Coetzer et al. | 429/103 |

OTHER PUBLICATIONS

Boxall et al., "Electrochemical Studies on Ag, Fe, and Cu Species in AlCl₃-NaCl Melts", J. Electrochem. Soc.: Electrochemical Science and Technology, Feb. 1974, pp. 212 to 219.

Primary Examiner—Stephen J. Kalafut
Attorney, Agent, or Firm—Arnold, White & Durkee

[57] ABSTRACT

A method of making an electrochemical cell comprises loading into a cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula MAlHal₄ wherein M is the alkali metal of the separator and Hal is a halide; an alkali metal halide MHal wherein M and Hal are respectively an alkali metal and a halide; a transition metal T selected from the group comprising Fe, Ni, Co, Cr, Mn and mixtures thereof, as an active cathode substance; and a current collector comprising at least one of copper, a copper-based substance, and a copper-coated substance, thereby to make an electrochemical cell precursor. The precursor is charged at a temperature at which the molten salt electrolyte and alkali metal M are molten, thereby halogenating the active cathode substance, with alkali metal M being produced and passing through the separator into the anode compartment.

24 Claims, 3 Drawing Sheets

ELECTROCHEMICAL CELLS

This invention relates to electrochemical cells. It relates also to a method of making an electrochemical cell. According to a first aspect of the invention, there is provided a method of making an electrochemical cell of the type comprising an anode compartment containing, at the operating temperature of the cell and when the cell is in its charged state, a molten alkali metal anode, a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode and Hal is a halide, the cathode compartment containing also a cathode which comprises an electronically conductive electrolyte-permeable matrix which has dispersed therein an active cathode substance which comprises a transition metal T selected from the group comprising Fe, Ni, Co, Cr, Mn and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into a cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the separator and Hal is a halide;

an alkali metal halide MHal wherein M and Hal are respectively an alkali metal and a halide;

a transition metal T selected from the group comprising Fe, Ni, Co, Cr, Mn and mixtures thereof, as an active cathode substance; and a current collector comprising at least one of copper, a copper-based substance, and a copper-coated substance, thereby to make an electrochemical cell precursor; and charging the precursor at a temperature at which the molten salt electrolyte and alkali metal M are molten, thereby halogenating the active cathode substance, with alkali metal M being produced and passing through the separator into the anode compartment, the proportions of alkali metal halide MHal and molten salt electrolyte being selected so that when the cell is fully charged and all the available active cathode substance has been halogenated, the proportions of alkali metal ions and aluminium ions in the electrolyte are such that the solubility of the active cathode substance in the molten electrolyte is at or near its minimum, with the production of alkali metal M and halogenation of the active cathode substance taking place in accordance with the following reaction:

$$2MHal + T \rightarrow 2M + THal_2 \quad (1)$$

Thus, the electrochemical cell precursor thus formed is transformed into an electrochemical cell by subjecting it to at least one charging cycle at a temperature at which the molten salt electrolyte and alkali metal M are molten, during which reaction (1) takes place during the charging cycle.

The method may hence include loading only sufficient transition metal T into the cathode compartment to satisfy reaction (1), so that there is no excess transition metal T in the cathode dispersed in the matrix to act as current collector, with the copper, copper-based or copper-coated substance thus fulfilling this function entirely.

The molar proportion or ratio of alkali metal ions and aluminium ions in the electrolyte is preferably not less than one, to obtain said minimum solubility.

While M and Hal of the alkali metal halide MHal will normally be the same as the M and Hal respectively of the electrolyte $MAlHal_4$, they can, however, instead be different.

The alkali metal, M, may be sodium, and the separator may be beta-alumina.

The halide may be chloride, so that the alkali metal halide is sodium chloride. The electrolyte may then be in the form of a sodium chloride - aluminium chloride mixture or in the form of the double salt, i.e. $NaAlCl_4$. The transition metal T of the active cathode substance may be a member of the group comprising Fe, Ni and mixtures thereof.

In one embodiment of the invention, the method may include initially loading also some aluminium into the cathode compartment, with no sodium being present in the anode compartment. On subjecting the cell precursor to an initial charging, the aluminium reacts with the alkali metal halide MHal to produce further molten salt electrolyte and to form alkali metal M which passes through the separator into the anode compartment.

Sufficient aluminium is then provided so that the initial reaction with the aluminium on charging provides the initial upstarting amount of sodium in the anode compartment, with normal charge and discharge reactions of the cell between its fully charged and discharged states, in accordance with reaction (1) thereafter taking place.

It has been found that during charging of Na/copper, sodium halide cells, for example, Na/copper, sodium chloride, the electrochemical charge reactions can be represented by $$Cu + NaCl \rightarrow CuCl + Na \quad (2)$$

$$CuCl + NaCl \rightarrow CuCl_2 + Na \quad (3)$$

$$\text{Overall: } Cu + 2NaCl \rightarrow CuCl_2 + 2Na \quad (4)$$

During these reactions, copper chlorides are produced. Therefore, if some copper chloride were to form during charging of the cells of the present invention, then this would be reduced immediately to Cu by the active cathode substance since the active cathode substances (Fe, Ni, Cr, Co or Mn) oxidize by chlorination at a voltage less than the open circuit voltage of the Cu/copper chloride//Na plateau.

The current collector may be more or less pure copper, and may be added to the cathode compartment in the form of strips, wire, rods and/or powder. It may instead be alloyed with, or coated on, the transition metal T, i.e. the active cathode substance, to form a conducting backbone. It may also instead itself be coated with the active cathode substance.

Hence, when the transition metal T is in the form of powder or filings, the copper may be present as a surface coating or alloy on the transition metal powder or filings.

The method may also include applying a protective layer to the current collector to prevent halogenation, e.g. chlorination, thereof, the protective layer being chemically and electrochemically inert in the cell environment and electronically conductive. The protective layer may be non-metallic, and may, in particular, be carbon, e.g. in the form of graphite. By utilizing such a protective layer, internal resistance rises can be eliminated or reduced significantly. The graphite or carbon layer or coating may be in the form of a thin flexible graphite foil or paper adhesively secured to the current collector to coat it. The glue used should be such that no residue thereof, possibly apart from carbon, remains on heating thereof. Alternatively, carbon or graphite powder can be admixed with paint or glue, e.g. organic paint or glue, to coat the collector, with heating thereafter to fix the carbon coating.

In another version of the invention, the active cathode substance may be loaded into the cathode compartment in the form of an intermediate refractory hard metal compound of said transition metal T with at least one non-metal of the group consisting of C, Si, B, N, and P, with the active cathode substance and the alkali metal halide then being mixed together in particulate form, e.g. granules, to form a mixture, the mixture sintered to form an electrolyte-permeable matrix, and the matrix impregnated with the molten salt electrolyte prior to loading thereof into the cathode compartment. If the copper is then in particulate form it can form part of this mixture which is sintered.

When the transition metal is iron, the cathode may include a small proportion of nickel and/or a chalcogen; and when the transition metal is nickel the cathode may include a small proportion of iron and/or a chalcogen such as sulphur.

When the matrix comprises at least one intermediate refractory hard metal compound it is, once said electrolyte has been impregnated therein and the NaCl and copper are incorporated therein, a cathode precursor which is coupled via the separator with the anode compartment and which becomes a cathode after it has been subjected to at least one charge cycle.

More specifically, forming the matrix may comprise sintering particles such as powders or fibres of the transition metal or intermediate refractory hard metal compound in a reducing atmosphere. Instead, forming the matrix may comprise forming a particulate mixture thereof with an organic binder, pressing the mixture into a unitary body and cracking the binder by heating the mixture under vacuum at a temperature above 400° C., which is sufficient to pyrolyse the binder. For example, a carbide of the transition metal in question can be mixed with a small quantity of a carbon-forming organic binder such as phenol formaldehyde resin, the resulting mix being pressed into an electrode shape, and the resin cracked in a vacuum at a temperature above 600° C., which temperature is selected to pyrolyse the binder to conductive carbon.

Incorporating the NaCl and the copper into the matrix may be effected simultaneously with the formation of the matrix, the NaCl and copper in finely divided particulate form being dispersed into the particulate material, e.g. granules, from which the matrix is formed, prior to formation of the matrix. Such granules can have an extremely high density. Hence, the incorporation into the granules of the copper results in additional porosity when the cell precursor is subjected to a first charging cycle in which it is transformed into a cell in discharged state, as hereinbefore described. Granulation also promotes homogeneity of chemical species within the cathode compartment.

Instead, the NaCl and copper may be incorporated into the matrix by melting the electrolyte and suspending particulate NaCl and copper in finely divided form in the molten electrolyte, prior to impregnating the electrolyte into the matrix, and then impregnating the electrolyte together with the NaCl and copper suspended therein, into the matrix.

It is hence apparent from the foregoing that the NaCl and copper be incorporated into the matrix in any one of a number of suitable different ways.

Impregnating the molten salt electrolyte into the matrix may be by means of vacuum impregnation with the electrolyte in the molten state.

When the refractory hard metal compound is present, conditioning of the cell by subjecting it to charge/discharge cycles will be necessary to activate it by halogenation of the intermediate refractory hard metal compound to bring it up to its maximum potential operating performance in the cell.

In another more specific version of the invention, the NaCl, copper and the transition metal may be combined by forming a mixture in particulate form of NaCl, copper and the transition metal. Still more particularly, the formation of the mixture may comprise mixing together a NaCl powder, the copper in powder form and a powder of the transition metal or compound thereof. Suitable iron and nickel powders are available from William Rowland Limited as 'TYPE C CARBONYL' and 'TYPE 225 CARBONYL' respectively.

Instead, the NaCl, copper and transition metal particles can be mixed after loading thereof into the cathode compartment.

The powder mixture may then be impregnated, e.g. saturated with the electrolyte, which may be effected simply by wetting the mixture with the electrolyte in molten liquid form, for example after the powder mixture has been packed, for example by tamping, into the cathode compartment. This will, in effect, provide a cathode precursor in a discharged state, which can then be activated by charging.

In the charging reaction of this precursor, the metal or intermediate refractory hard metal compound component of the mixture is chlorinated, sodium being produced during the chlorination, which sodium moves through the separator in ionic form, into the anode compartment where it exists in the charged or partially charged cell as molten sodium metal, electrons passing during the charging along the external circuit from the cathode compartment to the anode compartment.

Although the powder mixture may be charged in powder form after saturation with liquid electrolyte, the method may include as mentioned hereinbefore the additional step of sintering the powder mix to form a macroporous electrolyte permeable matrix prior to saturation with electrolyte, and activation by taking it through one or more charge cycles as a cathode to chlorinate it.

The method may include adding a minor proportion of NaBr to the electrolyte, to act as a getter for any copper chloride that may form locally, e.g. on overcharging, and which may dissolve in the electrolyte, the copper bromide thus formed being more insoluble than copper chloride in the electrolyte.

The method may instead, or additionally, also include adding a minor proportion of one or more of NaF, S and Se as a getter for undesirable copper species.

The getter or dopant may be added to the powder mix from which the cathode is formed, and dissolves in the electrolyte in use. The dopant or getter may comprise less than 10% (molar basis) of the electrolyte so that its proportion is sufficiently low for the electrolyte to maintain its essential character as a sodium aluminium chloride electrolyte.

The invention also extends to an electrochemical cell, when made according to a method as hereinbefore described.

According to a second aspect of the invention, there is provided a precursor for a high temperature electrochemical cell, which comprises a cell housing having an anode compartment and a cathode compartment separated from each other by a separator which comprises a solid conductor or ions of an alkali metal M, or a micromolecular sieve which contains alkali metal M sorbed therein, the cathode compartment containing an alkali metal aluminium halide molten salt electrolyte having the formula $MAlHal_4$ wherein M is the alkali metal of the separator and Hal is the halide;

an alkali metal halide MHal wherein M is an alkali metal and Hal is a halide;

a transition metal T selected from the group consisting Fe, Ni, Co, Cr, Mn and mixtures thereof, as an active cathode substance; and a current collector comprising of at least one of copper, a copper-based substance, and a copper-coated substance, the precursor being chargeable at a temperature at which the molten salt electrolyte and the alkali metal M are molten, to cause the active cathode substance to be halogenated while alkali metal passes through a separator into the anode compartment, thereby to form an electrochemical cell, the proportions of alkali metal halide MHal and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

Hence, as mentioned hereinbefore, once the precursor has been subjected to at least one charging cycle at a temperature at which the molten salt electrolyte and alkali metal are molten, it is transformed into an electrochemical cell.

As also mentioned hereinbefore, the active cathode substance as well as the alkali metal halide may be in particulate form, e.g. granules, with the alkali metal halide being mixed with the active cathode substance, and the mixture being impregnated with the molten salt electrolyte. The copper may be particulate and form part of said mixture, or form part of the granules.

In another embodiment of the invention, the cathode may comprise an electronically conductive electrolyte-permeable matrix in which the active cathode substance, copper current collector and alkali metal halide are dispersed, the matrix being impregnated with the molten salt electrolyte. In yet another embodiment of the invention, the cathode of the cell may comprise an electronically conductive electrolyte permeable macroscopically porous copper containing matrix having a chlorinated nickel-containing active cathode substance dispersed therein and the electrolyte and/or active cathode substance containing a minor proportion of a suitable chalcogen dispersed therein for resisting a progressive drop in the capacity of the cathode with repeated charge/discharge cycling thereof.

The substance may include $NiCl_2$ itself, one or more compounds of nickel which have been chlorinated, or combinations of the aforegoing. In a particular embodiment, the matrix itself may comprise nickel together with copper, with the active cathode substance comprising $NiCl_2$. Instead, the matrix may comprise a material which does not contain nickel, the substance then comprising an intermediate refractory hard metal compound of nickel, such as a phosphide, boride or silicide thereof, which has been activated by halogenation.

It will be appreciated that minor quantities of impurities may be tolerated in the electrolyte, i.e. substances which will ionize in the molten electrolyte to provide ions which affect the electrochemical action of the electrolyte, but the quantity of such impurities should be insufficient to alter the essential character of the electrolyte as an $MAlHal_4$ system as defined.

When the cathode includes iron as a transition metal in conjunction with a beta-alumina solid electrolyte or separator, it may also include a protective cathode substance which oxidizes by chlorination at a voltage less than the open circuit voltage of the $Fe/FeCl_3//Na$ plateau, and greater than the open circuit voltage of the cathode in its fully charged state when coupled with a sodium anode. This is required to prevent or inhibit formation of free $FeCl_3$, which would poison the beta-alumina, hence resulting in the cell resistance increasing.

The cathode may comprise $Fe/FeCl_2$ as an active cathode substance dispersed in the matrix, the protective cathode substance oxidizing by chlorination at a voltage greater than the open circuit voltage of the $Fe/FeCl_2//Na$ plateau.

The protective cathode substance may be dispersed in finely divided form through the cathode, and the protective cathode substance may be selected from the group consisting in $Ni/NiCl_2$, $Co/CoCl_2$ and combinations of $Ni/NiCl_2$ and $Co/CoCl_2$.

When the separator is a micromolecular sieve, it may be a tectosilicate, e.g. a felspar, felspathoid or zeolite. When it is a zeolite, the zeolite may be a synthetic zeolite such as zeolite 3A, 4A, 13X, or the like. Preferably, however, the separator is a solid conductor of sodium ions such as beta-alumina or nasicon. For example, a beta-alumina tube can be used. The interior of the tube may be used as the anode compartment, with the tube being located in a cell housing which defines a cathode compartment outside the tube, in the interior of the housing, and with an anode compartment current collector being in intimate electrical contact with substantially the entire separator. The tube will be sealed and may be evacuated prior to charging to resist undesirable pressure build-up therein as sodium moves into the anode compartment during charging, through the tube wall. In this specification, beta-alumina is used broadly to include all phases of sodium-ion conducting beta-alumina, such as beta-alumina.

To spread the sodium over the inside of the tube wall and to effect said intimate contact of the anode compartment current collector with the separator, suitable wicking material, electrically connected to the current collector and containing finely divided electrically conductive particles, may be spread over the wall surface.

The material may, for example, be iron mesh, optionally tinned. This mesh hence acts as a part of an anode current collector, and may be attached to an evacuation pipe of the same metal, used to evacuate the tube interior prior to charging and projecting out of the cell to form the remainder of the anode current collector.

The main current collector of the cathode of the cell of the present invention is the copper within the cathode compartment as well as the housing itself. The housing may also be of copper. The current collector may, as hereinbefore described, be coated with the active cathode substance, as well as a protective layer of carbon or graphite to prevent halogenation thereof during charging.

For close packing in batteries, the cell may have an elongate rectangular housing along the interior of which the tube extends in a more or less central position. To facilitate wicking in the anode compartment, the cell may be used horizontally, but this can lead to voids in the cathode compartment formed upon charging as the sodium moves into the anode compartment. For this reason, the cell may incorporate an electrolyte reservoir, more or less separate from but in communication with the cathode compartment, from which the electrolytes can pass, for example by draining under gravity, into the cathode compartment to keep it flooded with liquid electrolytes at all times. Naturally, for close packing, cells of similar construction but having an hexagonal cross-section can be employed instead.

The electrolyte may include a minor proportion of sodium fluoride or sodium bromide as dopant or getter. This combats $CuCl_2$ formation as hereinbefore described and the invention accordingly contemplates incorporating a small proportion of sodium fluoride or sodium bromide in the powder mix from which the cathode is formed. This sodium fluoride/bromide dissolves in the liquid electrolyte, in use. The electrolyte should be selected so that, at all states of charge, the solubility therein of transition metal chloride is at a minimum. This is achieved when the electrolyte comprises a mixture of sodium halide and aluminium halide in a 1:1 mole ratio, with the molten salt being in the presence of at least some solid sodium chloride at all stages of charge. The only alkali metal present should be those which do not adversely affect the beta-alumina separator, and, although pure sodium aluminium chloride can be used, said minor proportion of up to 10% on a molar basis or more of the electrolyte may be made up of sodium fluoride/bromide. This sodium fluoride will replace the equivalent proportion of sodium chloride, so that said 1:1 mole ratio is retained. The proportion of sodium fluoride/bromide will, however, be sufficiently low for the electrolyte to retain its essential character as a sodium aluminium chloride electrolyte. There must thus be enough sodium chloride/bromide, as mentioned above, for some solid sodium chloride/bromide to remain in the cathode compartment when the cell is fully charged, i.e. to maintain minimum solubility.

The liquid electrolyte and/or active cathode substance may contain a minor proportion of a suitable chalcogen dispersed therein for getting unwanted soluble copper species.

The chalcogen may comprise one or more species, such as selenium or sulphur, or compounds containing sulphur such as a transition metal sulphide. The chalcogen is preferably in extremely finely divided form, and it or reaction products between it and components of the liquid electrolyte may even be dissolved in the electrolyte.

The invention will now be described, by way of example, with reference to the accompanying drawings.

Figure 1:
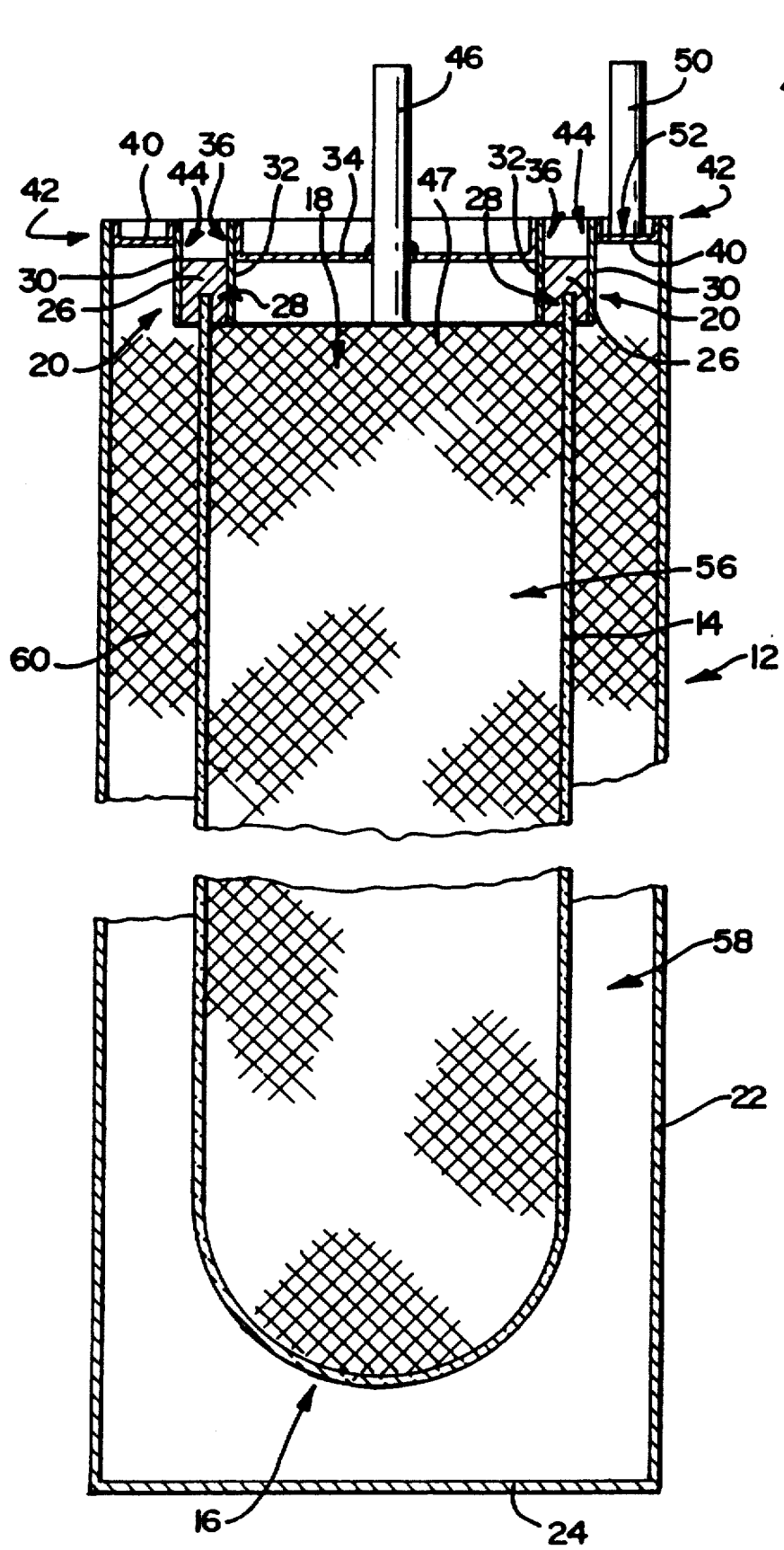
FIG. 1 shows a schematic sectional side elevation of an electrochemical cell in accordance with one embodiment of the present invention.

Referring to FIGS. and 2, reference numeral 10 generally indicates an electrochemical cell in accordance with the invention.

The cell 10 includes an outer cylindrical casing 12 having a side wall 22 connected to a circular floor 24; a beta-alumina tube 14 located concentrically within the casing 12, the tube 14 being closed at its one end 16 and open at its other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular groove 28 in the ring. Two concentric truncated cylinders of nickel, designated 30, 32, are bonded fluid tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, e.g. welded, to the casing at 42 and to the ring 30 at 44. A steel rod current collector 46 projects into the tube 14, and a steel rod current collector 50 protrudes from the disc 40 at 52. The current collector 46 is electrically connected to a porous wicking layer 47 lining the inside of the separator tube 14, i.e. in intimate contact with the tube 14, with finely divided electrically conductive particles, e.g. Ni and/or Fe particles incorporated in the layer.

An anode compartment 56 is hence provided inside the tube 14, with a cathode compartment 58 being provided around the outside of the tube 14, within the casing 12, the beta-alumina tube 14 hence constituting a separator between the anode and cathode compartments.

The side wall 22 of the casing 12 comprises a structural cylindrical member 62, typically of mild steel, coated on its inside with a layer 64 of copper, in accordance with the invention. A coating or layer 66 of nickel covers the layer 64 of copper. Hence, in the event of the layer 66 pinholing, the non-sacrificial layer 64 of copper acts as a protective barrier to the structural member 62. A protective layer 68 of carbon or graphite indicated in broken line in FIG. 2, to prevent chlorination of the collector, can also be provided on the current collector. The protective layer 68 comprises a thin flexible graphite foil or paper, e.g. that available in the UK under the trade mark 'FLEXICARB' and 'GRAFOIL', adhesively secured to the current collector 64 using an organic adhesive. The coated current collector is heated, e.g. to 300° C., to volatilize the glue and fix the layer 68 to the current collector, with the adhesive leaving no residue save for possibly some carbon.

Into the cathode compartment 58 there is placed an electrolyte permeable matrix 60 of Fe and Cu, with sodium chloride incorporated therein in dispersed form. Sufficient molten $NaAlCl_4$ electrolyte is then added to the cathode compartment so that the matrix is impregnated with the electrolyte and the electrolyte wets the separator or tube 14. The beta-alumina tube 14 hence forms a continuous barrier between the electrolyte containing cathode compartment 58 and the anode compartment 56, within the housing 12. Initially, the layer 47 ensures the required electrical contact between the collector 46 and the separator 16. However, on the first sodium passing through the separator it 'wicks' along the layer 47 thereby providing further electrical contact between the anode compartment and the separator.

On charging the cell 10, the following reactions take place in the cathode compartment:

$$2NaCl + Fe \rightarrow 2Na + FeCl_2 \quad (5)$$

The Na generated by reaction (2) passes through the beta-alumina into the anode compartment. Hence, only sufficient Fe is loaded into the cathode compartment to satisfy the requirements of reaction (2), with the copper acting as current collector in the cathode compartment.

Figure 2:
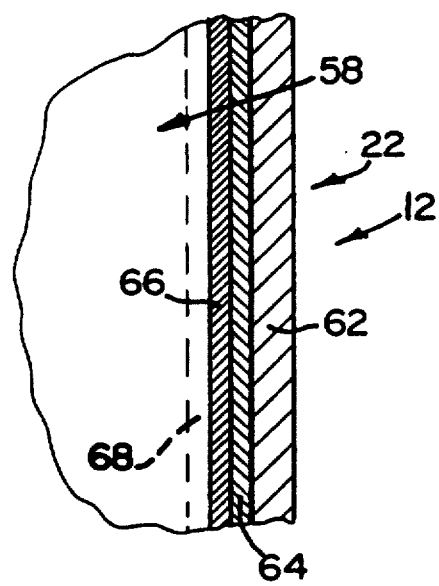
FIG. 2 shows an enlarged schematic sectional side elevation of part of the cell of FIG. 1.
Figure 3:
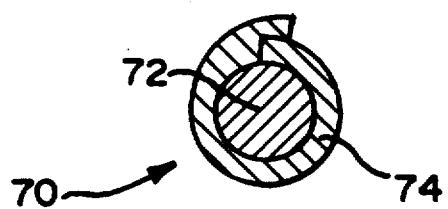
FIG. 3 shows a cross-sectional view of a cathode compartment current collector according to another embodiment of the invention.
Figure 4:
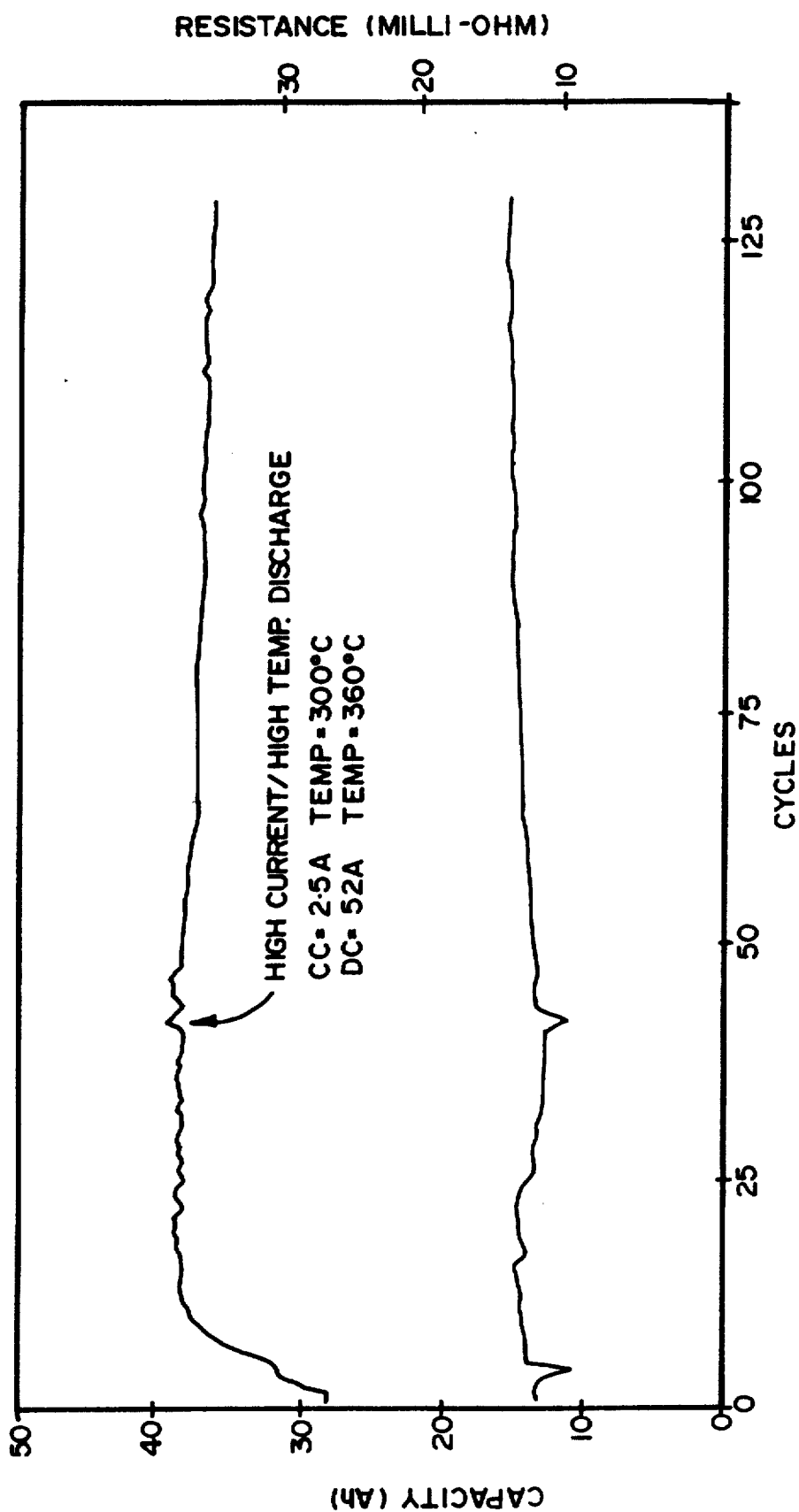
FIG. 4 shows a graph of the capacity of an electrochemical cell in accordance with another embodiment of the invention and being similar to that of FIG. 1, but having a cathode current collector according to FIG. 3.

A test was conducted with an electrochemical cell similar to that of FIGS. 1 and 2, but having as a cathode compartment current collector 70, a rod 72, having a diameter of about 5 mm, and a coating 74 of nickel around the rod, the coating being about 0.5 mm thick. A standard Ni cathode comprising 121 g Ni (Inco 238) intimately admixed with 79 g NaCl (<53um) was sintered around the nickel-clad copper rod current collector 70 in $H_2$ gas, to form an electrode. The electrode was loaded into a beta-alumina tube, impregnated with 4 g sulphur and then impregnated with sodium aluminium chloride electrolyte. The cell was heated to 300° C. and cycled at 2.5 A charge (6.25 mA $cm^{-2}$) and 10 A discharge (25 mA $cm^{-2}$). The cell had a theoretical capacity of 39 Ah. FIG. 4 shows that the capacity and resistance were stable for more than 125 cycles.

We claim:

1. A method of making an electrochemical cell of the type comprising an anode compartment containing, at the operating temperature of the cell and when the cell is in its charged state, a molten alkali metal anode, a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode and Hal is a halide, the cathode compartment containing also a cathode which comprises an electronically conductive electrolyte-permeable matrix which has dispersed therein an active cathode substance which comprises a transition metal T selected from the group comprising Fe, Ni, Co, Cr, Mn and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into a cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the separator and Hal is a halide;

an alkali metal halide MHal wherein M and Hal are respectively an alkali metal and a halide;

a transition metal T selected from the group comprising Fe, Ni, Co, Cr, Mn and mixtures thereof, as an active cathode substance; and a current collector comprising at least one of copper, a copper-based substance, and a copper-coated substance, thereby to make an electrochemical cell precursor; and charging the precursor at a temperature at which the molten salt electrolyte and alkali metal M are molten, thereby halogenating the active cathode substance, with alkali metal M being produced and passing through the separator into the anode compartment, the proportions of alkali metal halide MHal and molten salt electrolyte being selected so that when the cell is fully charged and all the available active cathode substance has been halogenated, the proportions of alkali metal ions and aluminium ions in the electrolyte are such that the solubility of the active cathode substance in the molten electrolyte is at or near its minimum, with the production of alkali metal M and halogenation of the active cathode substance taking place in accordance with the following reaction:

$$2MHal + T \rightarrow 2M + THal_2 \quad (1)$$

2. A method according to claim 1, which includes loading only sufficient transition metal T into the cathode compartment to satisfy reaction (1), so that there is no excess transition metal T in the cathode dispersed in the matrix to act as current collector, with the copper, copper-based or copper-coated substance thus fulfilling this function entirely.

3. A method according to claim I, wherein the alkali metal, M, is sodium; the separator is beta-alumina; the halide chloride, so that the alkali metal halide is sodium chloride; the electrolyte is in the form of a sodium chloride - aluminium chloride mixture or in the form of the double salt, i.e. $NaAlCl_4$; and the transition metal T of the active cathode substance is a member of the group comprising Fe, Ni and mixtures thereof.

4. A method according to claim 3, which includes initially loading also some aluminium into the cathode compartment, with no sodium being present in the anode compartment so that, on subjecting the cell precursor to an initial charging, the aluminium reacts with the alkali metal halide MHal to produce further molten salt electrolyte and to form alkali metal M which passes through the separator into the anode compartment, with sufficient aluminium being provided so that the initial reaction with the aluminium on charging provides the initial upstarting amount of sodium in the anode compartment, with normal charge and discharge reactions of the cell between its fully charged and discharged states, in accordance with reaction (1) thereafter taking place.

5. A method according to claim 3, wherein the current collector is more or less pure copper, and is added to the cathode compartment in the form of strips, wire, rods, or powder.

6. A method according to claim 3, wherein the current collector is more or less pure copper, and is alloyed with, or coated on, the transition metal T to form a conducting backbone.

7. A method according to claim 3, wherein the current collector is more or less pure copper, and is coated with the active cathode substance.

8. A method according to claim 3, wherein the current collector is more or less pure copper and the active cathode substance is in the form of an intermediate refractory hard metal compound of said transition metal T with at least one non-metal of the group consisting of C, Si, B, N, and P, with the active cathode substance, the copper and the alkali metal halide then being mixed together in particulate form to form a mixture, the mixture sintered to form an electrolyte-permeable matrix, and the matrix impregnated with the molten salt electrolyte prior to loading thereof into the cathode compartment.

9. A method according to claim 8, wherein the formation of the matrix comprises sintering particles of the intermediate refractory hard metal compound, the copper and the alkali metal halide in a reducing atmosphere.

10. A method according to claim 8, wherein the formation of the matrix comprises forming a particulate mixture of particles of the intermediate refractory hard metal compound, the copper and the alkali metal halide with an organic binder, pressing the mixture into a unitary body and cracking the binder by heating the mixture under vacuum at a temperature above 400° C., which is sufficient to pyrolyse the binder.

11. A method according to claim 3, wherein the current collector is more or less pure copper and the active cathode substance is in the form of an intermediate refractory hard metal compound of said transition metal T with at least one non-metal of the group consisting of C, Si, B, N, and P, with the particles being sintered to form an electrolyte-permeable matrix, the NaCl and copper being incorporated into the matrix by melting the electrolyte and suspending particulate NaCl and copper in finely divided form in the molten electrolyte, prior to impregnating the electrolyte into the matrix, and then impregnating the electrolyte together with the NaCl and copper suspended therein, into the matrix.

12. A method according to claim wherein impregnating the molten salt electrolyte into the matrix is by means of vacuum impregnation with the electrolyte in the molten state.

13. A method according to claim 3, wherein the current collector is more or less pure copper, with the cathode comprising a mixture in particulate form of NaCl, copper and the transition metal, and with the powder mixture being impregnated with the electrolyte.

14. A method according to claim 3, wherein the transition metal is iron, with a small proportion of nickel and/or a chalcogen being provided in the cathode.

15. A method according to claim 3, wherein the transition metal is nickel, with a small proportion of iron and/or a chalcogen being provided in the cathode.

16. A method according to claim 3, which includes adding a minor proportion of less than 10% (molar basis) of one or more of NaF, S and Se as a getter or dopant for undesirable copper species, with the reaction products, being insoluble in the electrolyte.

17. An electrochemical cell, when made according to claim 1.

18. A precursor for a high temperature electrochemical cell, which comprises a cell housing having an anode compartment and a cathode compartment separated from each other by a separator which comprises a solid conductor or ions of an alkali metal M, or a micromolecular sieve which contains alkali metal M sorbed therein, the cathode compartment containing
an alkali metal aluminium halide molten salt electrolyte having the formula $MAlHal_4$ wherein M is the alkali metal of the separator and Hal is the halide;
an alkali metal halide MHal wherein M is an alkali metal and Hal is a halide;
a transition metal T selected from the group consisting Fe, Ni, Co, Cr, Mn and mixtures thereof, as an active cathode substance; and
a current collector comprising at least one of copper, a copper-based substance, and a copper-coated substance, the precursor being chargeable at a temperature at which the molten salt electrolyte and the alkali metal M are molten, to cause the active cathode substance to be halogenated while alkali metal passes through a separator into the anode compartment, thereby to form an electrochemical cell, the proportions of alkali metal halide MHal and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

19. A precursor according to claim 18, wherein the active cathode substance, the copper, copper-based substance or copper-coated substance, and the alkali metal halide are in particulate form with the alkali metal halide and copper, copper-based substance or copper-coated substance being mixed with the active cathode substance, and the mixture being impregnated with the molten salt electrolyte.

20. A precursor according to claim 18, wherein the cathode comprises an electronically conductive electrolyte-permeable matrix in which the active cathode substance, copper current collector and alkali metal halide are dispersed, the matrix being impregnated with the molten salt electrolyte.

21. A precursor according to claim 18, wherein the cathode of the cell may comprise an electronically conductive electrolyte permeable macroscopically porous copper containing matrix having a chlorinated nickel-containing active cathode substance dispersed therein and the electrolyte and/or active cathode substance containing a minor proportion of a suitable chalcogen dispersed therein for resisting a progressive drop in the capacity of the cathode with repeated charge/discharge cycling thereof.

22. A precursor according to claim 21, wherein the matrix itself comprises nickel together with copper, with the active cathode substance comprising $NiCl_2$.

23. A precursor according to claim 18, wherein the electrolyte may include a minor proportion of sodium fluoride or sodium bromide as dopant or getter.

24. A precursor according to claim 18, wherein the liquid electrolyte and/or active cathode substance contain a minor proportion of a suitable chalcogen dispersed therein for getting unwanted soluble copper species.

* * * * *

UNITED STATES PATENT AND TRADEMARK OFFICE
CERTIFICATE OF CORRECTION

PATENT NO. : 4,992,345

DATED : February 12, 1991

INVENTORS : Meintjes, et al.

It is certified that error appears in the above-identified patent and that said Letters Patent is hereby corrected as shown below:

Claim 1, column 10, line 35, delete "Δ" and insert -- → --.

Signed and Sealed this

Twenty-third Day of June, 1992

Attest:

DOUGLAS B. COMER

*Attesting Officer*    Acting Commissioner of Patents and Trademarks